US008468195B1

(12) United States Patent
Gannu et al.

(10) Patent No.: US 8,468,195 B1
(45) Date of Patent: Jun. 18, 2013

(54) SYSTEM AND METHOD FOR CONTROLLING AN EXCHANGE OF INFORMATION IN A NETWORK ENVIRONMENT

(75) Inventors: Satish K. Gannu, San Jose, CA (US); Deepti Patil, San Jose, CA (US); Christian Posse, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 12/571,426

(22) Filed: Sep. 30, 2009

(51) Int. Cl.
*G06F 15/16* (2006.01)
*G06F 12/00* (2006.01)

(52) U.S. Cl.
USPC .......................................... 709/203; 709/250

(58) Field of Classification Search
USPC .................. 709/203, 217–218, 225–229, 250
See application file for complete search history.

(56) References Cited

U.S. PATENT DOCUMENTS

| | | | |
|---|---|---|---|
| 5,613,032 A | 3/1997 | Cruz et al. | |
| 5,677,901 A | 10/1997 | Iwamura | |
| 5,857,179 A | 1/1999 | Vaithyanathan et al. | |
| 5,961,582 A * | 10/1999 | Gaines .............................. | 718/1 |
| 6,012,053 A | 1/2000 | Pant et al. | |
| 6,026,388 A | 2/2000 | Liddy et al. | |
| 6,304,283 B1 | 10/2001 | Kitagawa | |
| 6,345,253 B1 | 2/2002 | Viswanathan | |
| 6,697,793 B2 | 2/2004 | McGreevy | |
| 7,017,183 B1 | 3/2006 | Frey et al. | |
| 7,099,867 B2 | 8/2006 | Okada et al. | |
| 7,260,312 B2 | 8/2007 | Srinivasan et al. | |
| 7,292,532 B2 | 11/2007 | Sakata et al. | |
| 7,350,227 B2 | 3/2008 | McGrew et al. | |
| 7,417,959 B2 | 8/2008 | Dorner et al. | |
| 7,457,808 B2 | 11/2008 | Gaussier et al. | |
| 7,493,369 B2 | 2/2009 | Horvitz et al. | |
| 7,509,491 B1 | 3/2009 | Wainner et al. | |

(Continued)

FOREIGN PATENT DOCUMENTS

| | | |
|---|---|---|
| CN | 102648464 A | 8/2012 |
| EP | 2483803 | 4/2011 |

(Continued)

OTHER PUBLICATIONS

Grimes, Seth, "Sentiment Analysis: Opportunities and Challenges," Beye Network; Jan. 22, 2008; 6 pages; http://www.b-eye-network.com/view/6744.

(Continued)

*Primary Examiner* — Zarni Maung
(74) *Attorney, Agent, or Firm* — Patent Capital Group

(57) ABSTRACT

A method is provided in one example and includes receiving data propagating in a network environment and organizing the data into one or more subjects. A request is received for information associated with a particular subject and an individual associated with the particular subject is identified. The request can be communicated to the individual if a request limit has not been exceeded for the individual. In other embodiments, a profile associated with each of a plurality of users in the network environment is maintained. The profile can include a number of questions presented to each user, a number of questions answered by each user, and a configured limit on how many questions each user is permitted to receive. In still other embodiments, a designation is made for a total number of requests that can be open between a plurality of users during a given time interval.

20 Claims, 5 Drawing Sheets

U.S. PATENT DOCUMENTS

| | | | |
|---|---|---|---|
| 7,706,265 | B2 | 4/2010 | Monette et al. |
| 7,809,714 | B1 | 10/2010 | Smith |
| 7,818,215 | B2 | 10/2010 | King et al. |
| 7,827,191 | B2 | 11/2010 | Williams |
| 7,853,553 | B2 | 12/2010 | Lankinen et al. |
| 7,913,176 | B1 | 3/2011 | Blattner et al. |
| 8,051,204 | B2 | 11/2011 | Kai et al. |
| 8,260,774 | B1 | 9/2012 | Aggarwal |
| 2002/0032772 | A1 | 3/2002 | Olstad et al. |
| 2002/0035605 | A1 | 3/2002 | McDowell et al. |
| 2003/0014448 | A1 | 1/2003 | Castellanos et al. |
| 2003/0028896 | A1 | 2/2003 | Swart et al. |
| 2003/0033288 | A1 | 2/2003 | Shanahan et al. |
| 2003/0093789 | A1 | 5/2003 | Zimmerman et al. |
| 2004/0158609 | A1 | 8/2004 | Daniell et al. |
| 2004/0193426 | A1 | 9/2004 | Maddux et al. |
| 2004/0208123 | A1 | 10/2004 | Sakata et al. |
| 2005/0060283 | A1* | 3/2005 | Petras et al. ............ 707/1 |
| 2005/0068167 | A1 | 3/2005 | Boyer et al. |
| 2005/0108001 | A1 | 5/2005 | Aarskog |
| 2005/0160166 | A1 | 7/2005 | Kraenzel |
| 2006/0150253 | A1* | 7/2006 | Feuerstein et al. ............ 726/26 |
| 2007/0016583 | A1 | 1/2007 | Lempel et al. |
| 2007/0118275 | A1 | 5/2007 | Qi et al. |
| 2007/0239837 | A1 | 10/2007 | Jablokov et al. |
| 2007/0244892 | A1 | 10/2007 | Narancic |
| 2007/0266020 | A1 | 11/2007 | Case et al. |
| 2008/0027981 | A1 | 1/2008 | Wahl |
| 2008/0065892 | A1 | 3/2008 | Bailey et al. |
| 2008/0091670 | A1 | 4/2008 | Ismalon |
| 2008/0097985 | A1 | 4/2008 | Olstad et al. |
| 2008/0140674 | A1 | 6/2008 | Ishikawa |
| 2008/0154873 | A1 | 6/2008 | Redlich et al. |
| 2008/0222142 | A1 | 9/2008 | O'Donnell |
| 2008/0244740 | A1 | 10/2008 | Hicks et al. |
| 2009/0006333 | A1 | 1/2009 | Jones et al. |
| 2009/0055175 | A1 | 2/2009 | Terrell et al. |
| 2009/0182727 | A1 | 7/2009 | Majko |
| 2009/0196570 | A1 | 8/2009 | Dudas et al. |
| 2009/0226870 | A1* | 9/2009 | Minotti ............ 434/322 |
| 2009/0254572 | A1 | 10/2009 | Redlich et al. |
| 2009/0276377 | A1 | 11/2009 | Dutta et al. |
| 2009/0293016 | A1 | 11/2009 | Potevin et al. |
| 2009/0327271 | A1 | 12/2009 | Amitay et al. |
| 2010/0010968 | A1 | 1/2010 | Redlich et al. |
| 2010/0057815 | A1 | 3/2010 | Spivack et al. |
| 2010/0153855 | A1 | 6/2010 | Roberts et al. |
| 2010/0179801 | A1 | 7/2010 | Huynh et al. |
| 2010/0223581 | A1 | 9/2010 | Manolescu et al. |
| 2010/0223629 | A1 | 9/2010 | Appelbaum et al. |
| 2010/0250547 | A1 | 9/2010 | Grefenstette et al. |
| 2010/0274815 | A1 | 10/2010 | Vanasco |
| 2010/0280985 | A1 | 11/2010 | Duchon et al. |
| 2011/0078167 | A1 | 3/2011 | Sundaresan et al. |
| 2011/0119264 | A1 | 5/2011 | Hu et al. |
| 2011/0173260 | A1 | 7/2011 | Biehl et al. |
| 2011/0208522 | A1 | 8/2011 | Pereg et al. |
| 2011/0225048 | A1 | 9/2011 | Nair |
| 2011/0270709 | A1 | 11/2011 | Lewis et al. |
| 2012/0002544 | A1 | 1/2012 | Kokku et al. |
| 2012/0030232 | A1 | 2/2012 | John et al. |
| 2012/0046936 | A1 | 2/2012 | Kandekar et al. |
| 2012/0102050 | A1 | 4/2012 | Button et al. |
| 2012/0110087 | A1 | 5/2012 | Culver et al. |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO2012/173780 | 12/2012 |

OTHER PUBLICATIONS iLogos v1.5 download (win); 4 pages. [Retrieved and printed on May 28, 2010] from http://www.phil.cmu.edu/projects/argument_mapping/.

Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.

Moorthi, Y. L. R., "Have Breakfast or Be Breakfast," Wall Street Journal, Feb. 8, 2010, 2 pages; http://online.wsj.com/article/SB126465641868236415.html#printMode.

Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w5045265r177/.

Trant, Jennifer, "Studying Social Tagging and Folksonomy: A Review and Framework," Jan. 2009, 10(1) Journal of Digital Information; 42 pages; http://dlist.sir.arizona.edu/arizona/handle/10150/105375.

U.S. Appl. No. 12/971,852, filed Dec. 17, 2010 entitled "System and Method for Providing Argument Maps Based on Activity in a Network Enviroment," Inventor(s): Deepti Patil, et al.

U.S. Appl. No. 12/971,946, filed Dec. 17, 2010 entitled "System and Method for Providing Feeds Based on Activity in a Network Environment,"Inventor(s): Satish K. Gannu, et al.

Ohl, Ricky, "Computer Supported Argument Visualisation: Modelling Wicked Problems," Ph.D. Thesis, Australian Digital Theses Program, Feb. 2008; 431 pgs.; http://gu.edu.au:8080/adt-root/public/adt-QGU20090724.155249/index.html.

PCT Notification of Transmittal (1 page) of the International Search Report (3 pages), and Written Opinion of the International Searching Authority, or the Declaration (6 pages) mailed Jan. 12, 2011 for PCT/US2010/050762.

Chen, Hsinchun, et al., "A Concept Space Approach to Addressing the Vocabulary Problem in Scientific Information Retrieval: An Experiment on the Worm Community System," Journal of the American Society for Information Science Wiley for Asis USA, vol. 48, No. 1, Jan. 1997, XP002614340, ISSN: 0002-8231; pp. 17-31.

Chen, Rung-Ching, et al., "Adding New Concepts on the Domain Ontology Based on Semantic Similarity," International Conference on Business and Information, Jul. 12-14, 2006, XP0021-314339; 14 pages; http://bai2006.atisr.org/CD/Papers/2006bai6169.pdf.

Sethy, Abhinav, et al., "Building Topic Specific Language Models from Webdata Using Competitive Models," 9th European Conference on Speech Communication and Technology, Eurospeech interspeech 2005 international Speech and Communication Association Fr., 2005, pp. 1293-1296; XP 002614341; http://sail.usc.edu/publications/sethy-euro2005.pdf.

U.S. Appl. No. 13/088,974, filed Apr. 18, 2011, entitled "System and Method for Providing Augmented Data in a Network Enviroment," Inventor(s): Satish K. Gannu et al.

U.S. Appl. No. 13/098,112, filed Apr. 29, 2011 entitled "System and Method for Evaluating Visual Worthiness of Video Data in a Network Environment", Inventor(s): Deepti Patil et al.

U.S. Appl. No. 13/098,434, filed Apr. 30, 2011 entitled "System and Method for Media Intelligent Recording in a Network Environment", Inventor(s): Ashutosh A. Malegaonkar et al.

Virage, "Audio Analysis," Autonomy Virage, © 2009 Autonomy Virage, 1 page http://www.virage.com/security-and-surveillance/functions/audio-analysis/index.htm.

Virage, "Understanding Video,"Autonomy Virage, © 2009 Autonomy Virage, 5 pages http://www.virage.com/rich-media/technology/understanding-video/index.htm.

U.S. Appl. No. 13/160,701, filed Jun. 15, 2011 entitled "System and Method for Discovering Videos," Inventor(s) Ashutosh A. Malegaonkar, et al.

U.S. Appl. No. 13/149,405, filed May 31, 2011 entitled "System and Method for Evaluating Results of a Search Query in a Network Environment," Inventor(s): Satish K. Gannu, et al.

U.S. Appl. No. 12/762,194, filed Apr. 16, 2010, entitled "System and Method for Deducing Presence Status from Network Data," Inventor(s): Thangavelu Arumugam, et al.

U.S. Appl. No. 12/778,899, filed May 12, 2010, entitled "System and Method for Deriving User Expertise Based on Data Propagating in a Network Environment," Inventor(s): Virgil N. Mihailovici, et al.

U.S. Appl. No. 12/475,486, filed Jun. 3, 2009, entitled "Authentication via Monitoring," Inventor(s): David McGrew and Sandeep Rao.

Nortel Networks Wireless Solutions (A. Silver, J. Larkins, O. Stringer), "Unified Network Presence Management" A White Paper, © 2000, 6 pages, www.mobilein.com/UNPM.pdf.

W.A. Montgomery, et al., "Network Intelligence for Presence Enhanced Communication," SPIRITS Working Group, May 2002, 9 pages, http://ietfreport.isoc.org/all-ids/draft-montgomery-copeland-presence-spirits-00.txt.

J. Kohl and C. Neuman, The Kerberos Network Authentication Service (V5), Network Working Group, RFC 1510.09.1993, 105 pages, http://www.ietf.org/rfc/rfc1510.

Lancope, "Stealth Watch, Revolutionize the Way You View Your Network," © 2009, 8 pages http://storage.paradot.com/2382/9637/StealthWatch_System_Family_Brochure.pdf.

E. Horvtz, et al., "Corrdinate: Probabilistic Forecasting of Presence and Availability," 2002, 10 pages, ftp://ftp.research.microsoft.com/pub/ejh/coordinate.pdf.

Andreas Hess, et al., "Multi-Value Classification of Very Short Texts," 8 pages, printed on May 12, 2010; http://www.andreas-hess.info/publications/hess-ki08.pdf.

U.S. Appl. No. 13/182,862, filed Jul. 14, 2011 entitled "System and Method for Deriving User Expertise Based on Data Propagating in a Network Environment," Inventor(s): Satish K. Gannu, et al.

Rosella Data Mining & Database Analytics, "Web Search and Web Navigation Pattern Analyzer," 3 pages; printed Jul. 25, 2011; http://222.roselladb.com/surf-pattern-analyzer.htm.

Caslon Analytics Echelon Note: Overview, May 2006, 6 pages; printed Sep. 30, 2009 http://www.caslon.com.au/echelonnote.htm.

Wikipedia, "International Phonetic Alphabet," 19 pages; printed Sep. 30, 2009; http://en.wikipedia.org/wiki/International_Phonetic_Alphabet.

Ronnie W. Smith, "Performance Measures for the Next Generation of Spoken Natural Language Dialog Systems," pp. 37-40; http://acl.ldc.upenn.edu/W/W97/W97-0607.pdf.

N.S. Jadhav and I.N. Dwivedi, "Social computing based personal vocabulary building," 5 pages; printed Sep. 30, 2009; http://www.priorartdatabase.com/IPCOM/000173550/.

Professor Anita Wasilewska, CSE 634—Data Mining: Text Mining; 85 pages; www.cs.sunysb.edu/~cse634/presentations/TextMining.pdf.

Trampoline Systems, "Navigation," 2 pages; printed Sep. 30, 2009; www.trampolinesystems.com.

Pete Swabey, "Making the Invisible Visible," 2 pages; Sep. 23, 2009; http://www.trannpolinesystems.com/news/in+the+news/archive/2009/59.

WebChoir Products—Personal Vocabulary Tools, "Personal Tools," 1 page; printed Sep. 30, 2009 http://www.webchoir.com/products/ptt.html.

U.S. Appl. No. 12/571,390, filed Sep. 30, 2009, entitled "System and Method for Generating Vocabulary From Network Data," Inventor(s): Thangavelu Arumugam, et al.

U.S. Appl. No. 12/471,404, filed Sep. 30, 2009, entitled "System and Method for Generating Personal Vocabulary from Network Data," Inventor(s): Satish K. Gannu, et al.

U.S. Appl. No. 12/571,414, filed Sep. 30, 2009, entitled "System and Method for Providing Speech Recognition Using Personal Vocabulary in a Network Environment," Inventor(s): Satish K. Gannu, et al.

U.S. Appl. No. 12/571,421, filed Sep. 30, 2009, entitled "System and Method for Ensuring Privacy While Tagging Information in a Network Environment," Inventor(s): Satish K. Gannu, et al.

Lacher, Martin S., et al., "On the Integration of Topic Maps and RDF Data," Extreme Markup Languages 2001, 10 pages.

Wang, Xuerui, et al., "Topics over Time: A NonMarkov Continuous Time Model of Topical Trends," KDD'06, Aug. 20-23, 2006, 10 pages.

U.S. Appl. No. 13/364,102, filed Feb. 1, 2012 entitled "System and Method for Creating Customized On-Demand Video Reports in a Network Environment," Inventor(s): Deepti Patel, et al.

Li, Yingbo, et al., "Multi-Video Summarization Based on OB-MMR," EURECOM, Sophia Antipolis, France, Content-Based Multimedia Indexing (CBMI) 2011 9th International Workshop; 6 pages. http://www.eurecom.fr/fr/publication/3365/download/mm-publi-3365.pdf.

Masnick, Mike, "Creating an Automatic Highlight Reel for Sporting Events (Bleeding Edge)," Tech Dirt lite, Aug. 20, 2003, 2 pages http://www.techdirt.com/article_lite.php?sid=20030820/0042248&pid=17.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(53)-Event-Based-Video-Surveillance.

Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.

PCT Apr. 3, 2012 International Preliminary Report on Patentability and Wrtten Opinion of the International Searching Authority from International Application PCT/US2010/050762; 7 pages.

EPO Nov. 7, 2012 Response to Communication pursuant to Rule 161(1) and 162 from European Application No. 10770664; 8 pages.

PCT Oct. 4, 2012 Notification of Transmittal of the International Search Report and Written Opinion of the International Search Authority from Application PCT/US2012/040097; 15 pages.

Bollen, et al., "Usage Derived Recommendations for a Video Digital Library," Journal of Network and Computer Applications, Academic Press, New York, NY, vol. 30, No. 3, Mar. 16, 2007.

Umbrich J., et al., "Four Heuristics to Guide Structured Content Crawling," Eighth International Conference on WEB Engineering, 2008, Jul. 14, 2008; © 2008 IEEE DOI 10.1109/ICWE.2008.42.

U.S. Appl. No. 13/608,787, filed Sep. 10, 2012 entitled "System and Method for Enhancing Metadata in a Video Processing Environment," Inventor(s) Sandipkumar V. Shah, et al.

"Click Scoring Relevance Framework," LucidWorks, 7 pages [retrieved and printed May 7, 2012] http://lucidworks.lucidimagination.com/display/lweug/Click+Scoring+Relevance+Framework.

"Google Custom Search," Web Page, Google.com, © 2012 Google, 1 page http://www.google.com/cse/.

"Recommender System," Wikipedia, Apr. 28, 2012; 9 pages http://en.wikipedia.org/wiki/Recommender_system.

"Understanding Metadata," NISO Press, National Information Standards Organization, 2004, 20 pages.

Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.

Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.

Gligorov, User-generated Metadata in Audio-visual Collections, Proceedings of the International World Wide Web Conference, WWW 2012, Apr. 16-20, 2012, Lyon, France (2012); 5 pages.

Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.

Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.

Rodriguez, et al. Automatic Metadata Generation Using Associative Networks, ACM Transactions on Information Systems, vol. 27, No. 2, Article 7, Feb. 2009.

Telestream, Inc. Product Literature, "Extracting and Preparing Metadata to Make Video Files Searchable," Telestream, Inc. 2008; 6 pages.

Yuen, L., et al., "Excalibur: A Personalized Meta Search Engine," Computer Software and Applications Conference 2004, COMPSAC 2004 Proceedings of the 28th Annual International, 2 pages.

Seher, Indra, "Query Expansion in Personal Queries," IADIAS (International Association for Development of the Information Society) 2006, 5 pages www.iadis.org/Multi2006/papers/16/5023_ISA.

Jiang, Weiliang, et al., "A Method for Personal Query Based on Role Preference Ontology," Industrial Mechanatronics and Automation, ICIMA 2009 International Conference, pp. 479-481; Abstract Only, 1 page.

Caslon Analytics Echelon Note: Overview, May 2006, 6 pages; printed Sep. 30, 2009 http://www.caslon.conn.au/echelonnote.htm.

Andreas Hess, et al, "From Web 2.0 to Semantic Web: A Semi-Automated Approach," 15 pages; printed Sep. 30, 2009; http://www.andreas-hess.info/publications/hess-cisweb08.pdf.

Wikipedia, "Homophone," 3 pages; printed Sep. 30, 2009; http://en.wikipedia.org/wiki/Homophone.

R. Billi et al., "Interactive Voice Technology at Work: The CSELT Experience," 2$^{nd}$ IEEE Workshop on Interactive Voice Technology for Telecommunications Applications (IVTTA94); Sep. 26-27, 1994; pp. 43-48; http://ieeexplore.ieee.org/stamp/stamp.jsp?arnumber=00341547.

Wikipedia, "International Phonetic Alphabet," 19 pp.; printed Sep. 30, 2009; http://en.wikipedia.org/wiki/International_Phonetic_Alphabet.

"The LNTS Leap: Phoneme Recognition," 2 pages; printed Sep. 30, 2009; http://www.Intstech.com.

NSA Watch, "Other Surveillance Network: Governmental Surveillance Agencies," 2 pages; printed Sep. 30, 2009; http://www.nsawatch.org/networks.html.

Nexidia, "Audio and Speech Analytics Software," 1 page; printed Sep. 30, 2009; http://www.nexidia.com.

Ronnie W. Smith, "Performance Measures for the Next Generation of Spoken Natural Language Dialog Systems," pp. 37-40; http://acl.ldc.upenn.edu/W/W97/W97-0607.pdf (Jan. 1997).

Wikipedia, "Phoneme," 7 pages; printed Sep. 30, 2009; http://en.wikipedia.org/wiki/Phoneme.

N. S. Jadhav and I.N. Dwivedi, "Social computing based personal vocabulary building," 5 pages; printed Sep. 30, 2009; http://www.priorartdatabase.com/IPCOM/000173550/.

Carnegie Mellon University, "Speech at CMU," 4 pages; printed Sep. 30, 2009; http://www.speech.cs.cmu.edu/speech/.

Professor Anita Wasilewska, CSE 634—Data Mining: Text Mining; 85 pages; www.cs.sunysb.edu/~cse634/presentations/TextMining.pdf (May 2005).

* cited by examiner

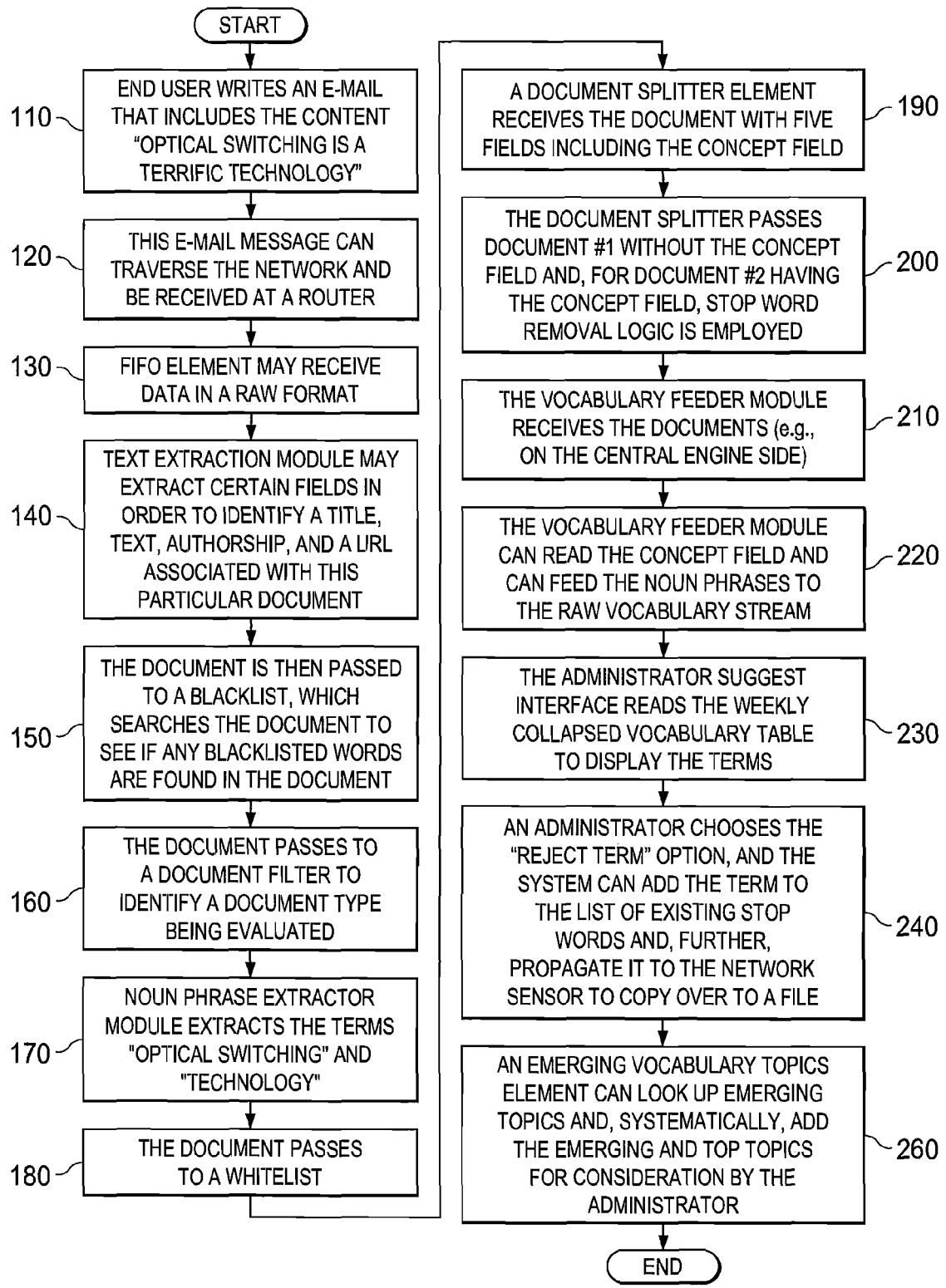

SYSTEM AND METHOD FOR CONTROLLING AN EXCHANGE OF INFORMATION IN A NETWORK ENVIRONMENT

TECHNICAL FIELD

This disclosure relates in general to the field of communications and, more particularly, to controlling an exchange of information in a network environment.

BACKGROUND

The field of communications has become increasingly important in today's society. In particular, the ability to effectively gather, associate, and organize information presents a significant obstacle for component manufacturers, system designers, and network operators. As new communication platforms and technologies become available, new protocols should be developed in order to optimize the use of these emerging protocols. Some issues have arisen in data monitoring scenarios in which content (sought to be properly organized) propagates in the network. Certain individuals may be identified as having expert information in a particular field. However, there is no intelligent coordination involved in exchanging expert knowledge in a given community.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified flowchart illustrating a series of example steps associated with the communication system.

DETAILED DESCRIPTION OF EXAMPLE EMBODIMENTS

Overview

A method is provided in one example and includes receiving data propagating in a network environment and organizing the data into one or more subjects. A request is received for information associated with a particular subject and an individual associated with the particular subject is identified. The request can be communicated to the individual if a request limit has not been exceeded for the individual. In other embodiments, a profile associated with each of a plurality of users in the network environment is maintained. The profile can include a number of questions presented to each user, a number of questions answered by each user, and a configured limit on how many questions each user is permitted to receive. In still other embodiments, a designation is made for a total number of requests that can be open between a plurality of users during a given time interval. A response to the request from the individual can be rated, where an individual is credited with a point based on the response.

Example Embodiments

Figure 1:
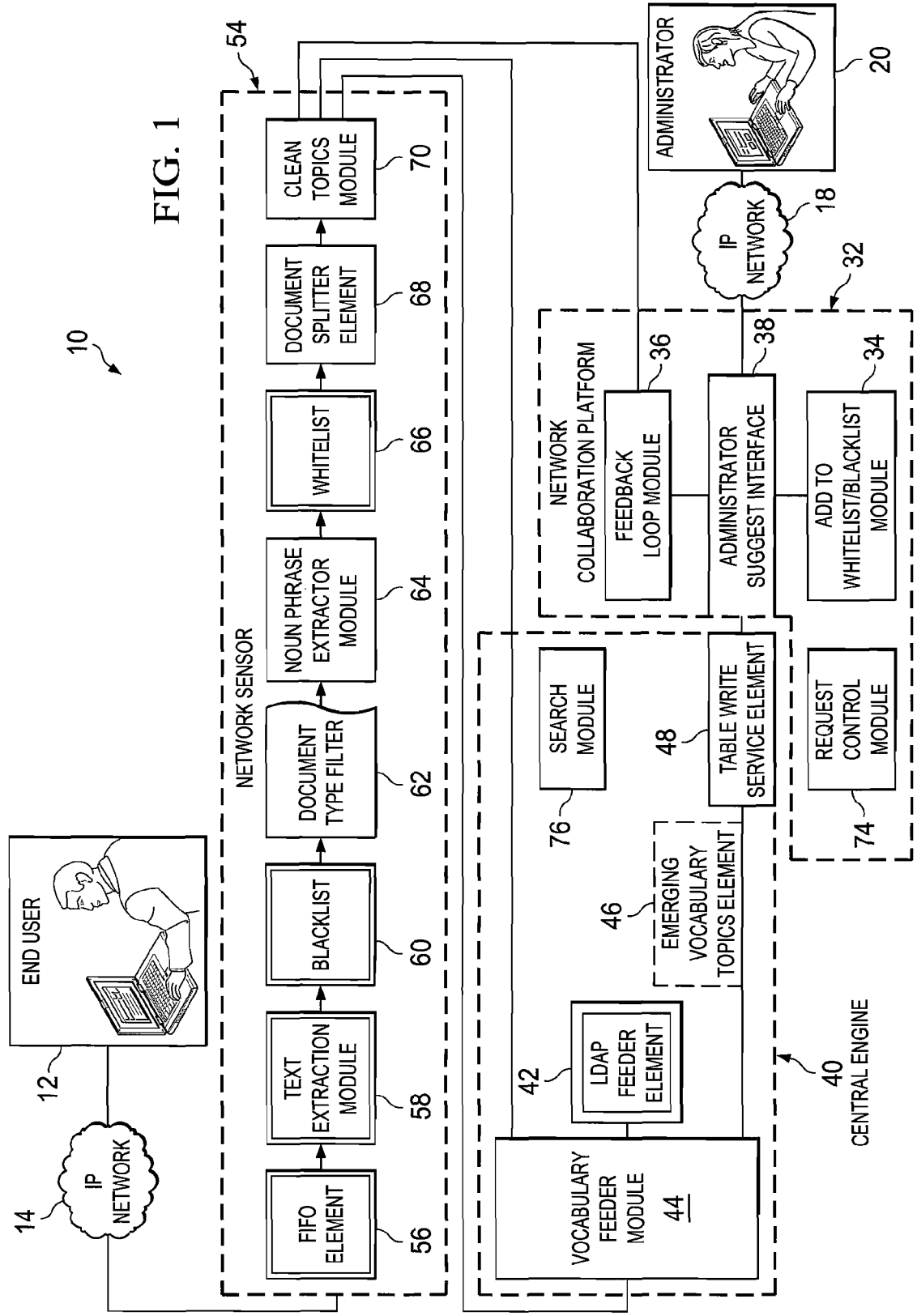
FIG. 1 is a simplified block diagram of a communication system for managing network data in accordance with one embodiment.

FIG. 1 is a simplified block diagram of a communication system 10 for managing network data in accordance with one embodiment. FIG. 1 may include an end user 12, who is operating a computer device that is configured to interface with an Internet Protocol (IP) network 14. In addition, an administrator 20 is provided, where administrator 20 has the ability to interface with the architecture through an IP network 18. Communication system 10 may further include a network collaboration platform (NCP) 32, which includes an add to whitelist/blacklist module 34, a feedback loop module 36, an administrator suggest interface 38, and a request control module 74. FIG. 1 may also include a central engine 40, which includes a lightweight directory access protocol (LDAP) element 42, a vocabulary feeder module 44, an emerging vocabulary topics element 46, a table write service element 48, and a search module 76.

FIG. 1 may also include a network sensor 54 that includes a first in, first out (FIFO) element 56, a text extraction module 58, a blacklist 60, a document type filter 62, a noun phrase extractor module 64, a whitelist 66, a document splitter element 68, and a clean topics module 70. Multiple network sensors 54 may be provisioned at various places within the network and such provisioning may be based on how much information is sought to be tagged, the capacity of various network elements, the number of users in a network community, etc.

Note that before turning to the example flows and infrastructure of example embodiments of the present disclosure, a brief overview of the workflow of the architecture is provided. There are two different operations associated with communication system 10. The first operation is associated with intelligently collecting data associated with end users in a network community. Once the data is collected, it can be suitably categorized such that particular individuals may be identified as having certain expert knowledge. A second operation of the present disclosure is associated with attempting to coordinate the interaction between individuals, as they attempt to query each other for expert information. In regards to the second operation, communication system 10 can control and distribute the number of questions posed to an expert (i.e., a help provider) to protect against query overload. Additionally, the architecture can delineate boundaries for these identified experts and better manage the time spent by experts in resolving questions from their peers.

In one example implementation, there are specific parameters that are configured in terms of how many questions can be asked, how many open questions are permitted in the system, how many total questions can be asked to a given expert, how many questions each individual may ask his community (i.e., a quota system for questions), etc. These parameters are detailed below with reference to particular examples that illustrate some of the teachings of the present disclosure.

Thus, communication system 10 can offer a solution to locate expertise within an enterprise based on monitoring network data. Note that experts in an organization can quickly become overwhelmed when they volunteer to resolve questions. The individuals having a large amount of knowledge tend to get flooded by continuous demands for help. One aspect of communication system 10 is provided to protect experts from being burdened with an inordinate number of requests. In one example, an administrator can set overall limits to the system (e.g., total number of open questions at a given time), and users in the community can set limits on the number of questions they would be willing to field at any given time interval. That time interval may be further segmented into shorter time intervals (e.g., only three questions would be permitted during a weekly time interval, only ten questions during a monthly time interval, etc.) to further control the number of questions being posed. A ratings and scoring system can be used by a corporation to reward individuals for being helpful in the community. In addition, quotas can be used to curb the number of questions each individual may be permitted to ask his colleagues.

Further, the architecture can be designed to motivate users to continue offering helpful information by providing a point system for answering particular questions. The point system could be used by an enterprise to reward its employees (e.g., via monetary compensation, vacation days, free meals, or any other suitable incentive). It should also be noted that such a system could encourage the organization to quickly resolve outstanding questions in an effective manner.

In one example, the architecture is configured to track the exact number of questions resolved by particular individuals. Thus, if an end user quickly resolved an issue for the community, he would not be obligated immediately thereafter with additional questions. Along similar reasoning, users who are effective at resolving queries would have the total number of queries set to a configured limit. In addition, the person posing the question (i.e., the help seeker) can be empowered to choose the expert to answer his particular question. The help seeker can exercise his own discretion or preference in choosing a particular help provider (e.g., the help seeker can filter his results based on presence availability).

Note that each corporate organization typically has its own unique working culture. Each particular work environment has a particular way in which it poses and resolves questions effectively. Individual questions can have various layers of complexity, diverse deadlines, and assorted time expenditures necessary to properly answer a question. The architecture presented herein can empower an administrator to set limits to suit their particular organizational structure. Additionally, the architecture can offer hints to an administrator for configuring the most appropriate parameters (e.g., quotas and limits) for both asking and answering questions. These parameters can be used to create a balanced environment that encourages collaboration without overburdening knowledgeable individuals. Part of the present disclosure addresses intelligently identifying experts from data monitoring activities, while another part of the present disclosure efficiently manages employee time once an expert is identified.

Note that most companies have employees that have a certain set of responsibilities, where a solicitation to answer a question is beyond an employee's job boundaries. This creates a problem because employees are generally not incentivized to answer questions, and particularly helpful employees are not rewarded for their responsiveness. One challenge is to protect overloading knowledgeable workers from an excessive number of questions. The other challenge involves trying to connect a knowledgeable worker to a colleague who genuinely needs assistance in a particular subject area.

In one example implementation, the system can automatically assign a point or a score to the help provider whenever he takes the time to respond to a question. The point being assigned can include various factors that qualitatively assess the answer (e.g., the time to respond, the quality of the response, the need to ask follow-up questions to clarify an issue, etc.). Additional details related to this point allocation or the rating system, along with the question management features of the present disclosure, are provided below with reference to FIGS. 2-4.

Turning to the data monitoring activities that engender the identification of experts for possible questions, automatic vocabulary generation protocols attempt to solve the problem of manually building a vocabulary. Most approaches are time consuming, inflexible, and difficult to manage (e.g., in the context of adding/deleting/modifying terms for a whitelist, a blacklist, etc.). Communication system 10 can offer an architecture that provides an effective tagging for content propagating through a given network. Such an architecture offers flexibility in that it can be configured to protect employee privacy and sensitive content, for example, where only content that matches a controlled business vocabulary is extracted and suitably indexed.

In addition, communication system 10 offers a vocabulary building mechanism that is aligned with the evolving vernacular of a business. This can mean that (in one general sense), the controlled vocabulary can be viewed as a living entity that automatically and rapidly evolves with new/emerging business content. One aspect of the architecture involves a noun phrase extraction component, which can be provided along with filtering mechanisms, and stream access counts to retrieve popular and/or new vocabulary terms.

In one example implementation, the premise can include having the architecture suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. Additionally, note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data. The term 'request' as used herein in this Specification encompasses any type of query, question, quiz, inquiry, probe, survey, study, review, or any other statement, document, or writing that attempts to analyze or evaluate a given topic. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10. Note that a particular example flow associated with the data monitoring capabilities of the present disclosure is provided below with reference to FIG. 5.

Turning to the infrastructure of FIG. 1, IP networks 14 and 18 represent a series of points or nodes of interconnected communication paths for receiving and transmitting packets of information, which propagate through communication system 10. IP networks 14 and 18 offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 14 and 18 can implement a TCP/IP communication language protocol in a particular embodiment of the present disclosure; however, IP networks 14 and 18 may alternatively implement any other suitable communication protocol for transmitting and receiving data packets within communication system 10.

Each of the components illustrated in FIG. 1 may include one or more hardware or software modules for achieving specific functions, which assist or otherwise achieve the teachings of the present disclosure. These particular functions are described throughout this Specification. In alternative implementations, these functions can be suitably consolidated or otherwise treated based on particular needs. Network sensor 54, central engine 40, and/or network collaboration platform 32 can readily be part of a server in certain embodiments of this architecture. In one example implementation, these are network elements that facilitate or otherwise help coordinate the vocabulary building and/or query controlling operations, as explained herein. As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In operation of a simplified example used for discussion purposes, the extraction and processing operations can be performed on network sensor 54, where those results may be later provided to NCP 32, and/or to a suitable administrator interface, etc. A "concept" field can be created and this contains a list of the noun phrases extracted from the document (e.g., separated by commas). In the first example, the concept field contains tokens such as: [Text] Apple Mac is a computer; [Concept] Apple Mac, computer. In the second example, the concept field contains tokens such as: [Text] The green apple is good; [Concept] green apple.

In one example, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. In addition, most search queries are noun phrases. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on central engine 40 (e.g., this could make implementation of the feedback loop more efficient). In other instances, the stop word removal feature is placed on network sensor 54 so that only the filtered fields are sent to central engine 40. The concept field can be accessible like other fields in the received/collected documents. The concept field is a list of string field values. Additional functionalities associated with these operations are best understood in the context of several examples provided below.

In one example implementation, network sensor 54 includes software (e.g., as part of noun phrase extractor module 64) to achieve the vocabulary building operations, as outlined herein in this document. In addition, network collaboration platform 32 includes software (e.g., as part of request control module 74) to control requests and queries that are asked/answered in the user community. In other embodiments, these features may be provided externally to any of the aforementioned elements, or included in some other network device to achieve these intended functionalities. Alternatively, several elements may include software (or reciprocating software) that can coordinate in order to achieve the operations, as outlined herein. In still other embodiments, any of the devices of FIG. 1 may include any suitable algorithms, hardware, software, components, modules, interfaces, or objects that facilitate these operations. Additional operational capabilities of communication system 10 are detailed below with respect to FIGS. 2-5.

Figure 2:
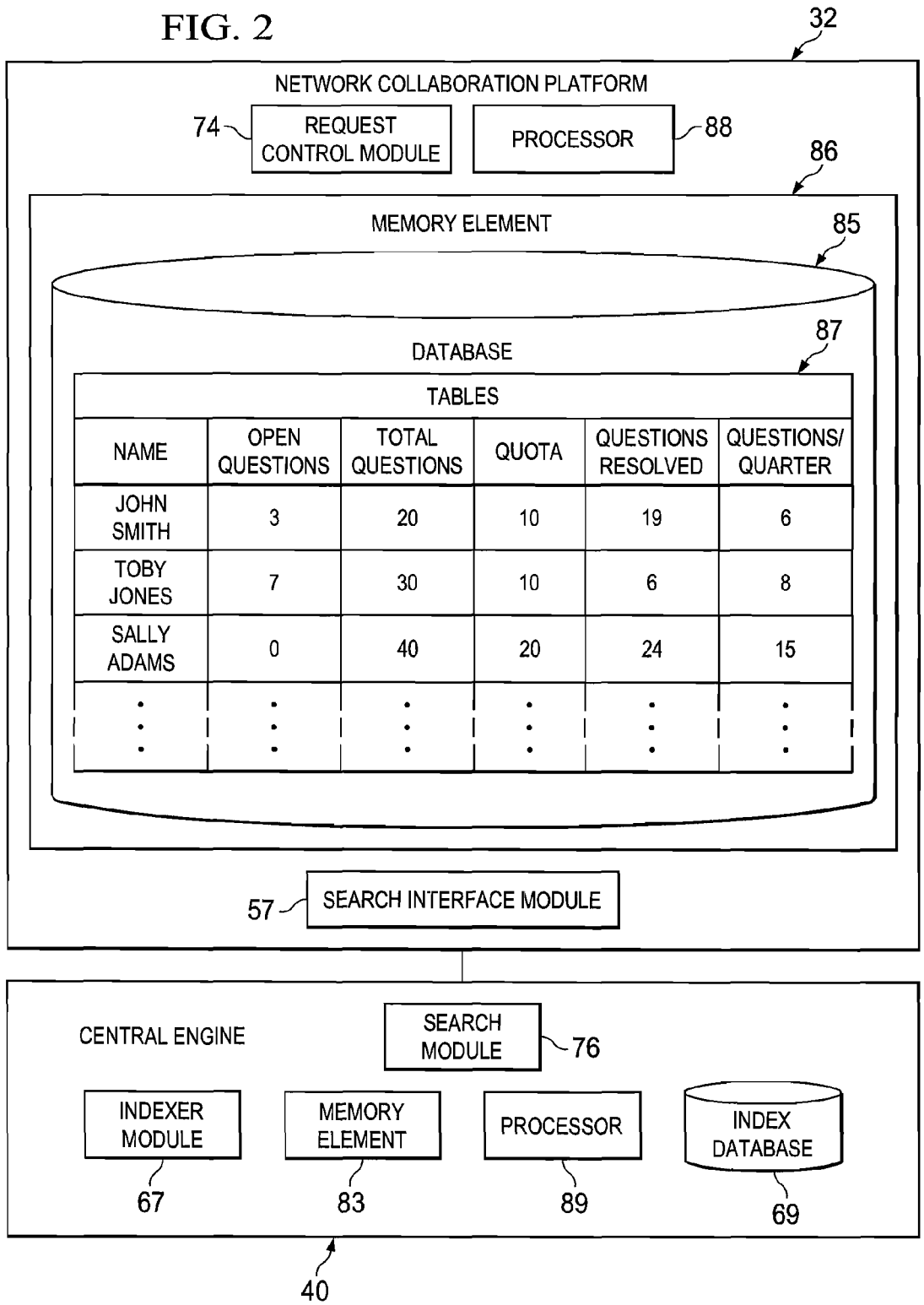
FIG. 2 is a simplified block diagram of an example component that may be included in the communication system.

Turning to FIG. 2, FIG. 2 is a simplified block diagram of network collaboration platform 32, which includes a search interface module 57 that can be configured to interact with search module 76 of central engine 40. For searching activities associated with the platform and which can assist in identifying experts to which to pose questions, search interface module 57 may be used by a given individual to search for specific topics. For example, if an individual were seeking information associated with deep packet inspection (DPI), he could use network collaboration platform 32 (and more specifically, search interface module 57) to perform a number of searches to find individuals, files, documents, media, or any objects that may potentially offer guidance in this area. In one instance, the actual searching algorithm is embodied in search module 76, which has logical connections to an indexer module 67, an index database 69, a processor 89, and a memory element 83. Once the search results have been identified, they can be delivered back to search interface module 57 for presentation to the individual. From that point, the user may select a particular individual based on any suitable criteria (e.g., previous experiences with a particular help provider, geographic proximity to the potential help provider, native language shared by the help seeker in the help provider, etc.). Note that the architecture is capable of translating questions and responses between languages such that questions posed in one language can be answered in another and translated back and forth in two directions. This could be particularly helpful for companies that have significant international operations.

In addition, network collaboration platform 32 may include request control module 74 that can access a processor 88 and a memory element 86, which includes a database 85. Within database 85 are multiple tables 87 that can include various parameters associated with particular end users. For example, in one instance, tables 87 include an identifier for each individual (i.e., a user name in this example), and the number of open questions to which the individual has obligated himself. In addition, each individual is offered a quota of questions that he may use at his discretion in querying his colleagues. Also tabulated in tables 87 is the number of questions resolved by this particular individual. In addition, tables 87 may include a parameter that dictates the maximum number of questions per time interval (e.g., per quarter, per month, etc.) a particular individual could be asked. Note that each time interaction occurs amongst users and the community, counters may be incremented, decremented, or otherwise altered in order to suitably reflect this activity. Similarly, quota can be marked as used and unused as the users (who are subscribed to the system) continue to query each other for information. For example, even if the user were the top expert in a given area, if the number of questions previously configured have been exceeded, he would not be contacted for new questions. In this sense, the configuration builds in a boundary to prevent query overload.

Indexer module 67 is configured to assist in categorizing the words, noun phrases, files, media, documents, etc. collected in communication system 10. Those indices can be stored in index database 69 (e.g., in the form of a table), which can be searched by a given administrator or end user. Along similar reasoning, a topics database could store words, noun phrases, files, media, documents, etc. associated with particular topics identified within the enterprise and/or personal vocabulary. A separate collaboration database could store results in which multiple end users (e.g., along with administrator 20) formulate or refine the aggregated personal vocabulary words and/or noun phrases. Another storage area (e.g., index database 69) could store the resultant composite of vocabulary words (e.g., per individual, per subject area, etc.), files, media, documents, etc. or such information can be stored in any of the other databases depicted in FIG. 2. It is imperative to note that this example of FIG. 2 is merely representing one of many possible configurations that central engine 40 and network collaboration platform 32 could have. Other permutations are clearly within the broad scope of the tendered disclosure.

In operation of one example implementation, a number of variables can be used in order to control the number of queries being issued by users in the community. In this particular implementation, n=sum of all users in the system; HP=Help Provider (who may also be referred to as an expert or an expertise provider); HS=Help Seeker (the may also be referred to as a person posing the query); XCur=running count of the number of questions asked to the HP; XMonthCur=running count of the number of open questions for the month; WCur=running count of the number of questions a particular HS has asked; ZCur=running count of the number of open questions in the entire system.

In one example, the administrator may control the following: ZLim=total number of open questions in the whole system at any given point in time; WLim=the total number of questions that a help seeker can ask at any point in time. Note that an administrator could readily determine that certain employees have sensitive schedules and significant time demands such that they would not be appropriate candidates to answer questions. For example, even though a Vice President may have knowledge about a particular technology area, he may travel frequently or have other priorities such that he should not be populated in search queries for knowledge about particular topics. In other examples, the administrator could suspend questions being asked of users in particular business segments, which are extraordinarily busy. The suspension could be removed once normal activities have resumed for the business segment.

For the particular user controls, users can be provided with the opportunity to set values for themselves with the assumption that the users could be help providers for a certain topic and a help seeker for others. In one example, the following variables may be configured by individual users of the system: XLim=the maximum number of questions the help provider has chosen to receive at any given point in time; XMonthLim=the maximum number of questions the help provider has chosen to receive in a given time interval. In this particular example, a monthly time interval has been chosen, but this time interval is arbitrary and could be varied considerably (e.g., weekly, quarterly, annually, daily, etc.) without departing from the scope of the present disclosure.

In this particular example, the XMonthLim variable can reset at the end of the time interval (i.e., each month). The XMonthCur variable can increment when a question is asked to the help provider and, in one example, does not decrement until one of the following activities occur: a question expires, a question is closed by the help seeker, or a time interval elapses. In one instance, the XCur variable can increment when a question is asked to the help provider and it is prohibited from decrementing. The XLim variable can increment when the help provider explicitly modifies his/her settings (or based on some default mechanism). The WLim variable can increment when the administrator explicitly changes this value.

The WCur variable can be designated per help seeker, where it would increment when that help seeker asks a question in the community. In one instance, this particular variable would not decrement until the question expires, or the question is closed by the help seeker. Note that the help seeker can ask a question if the WCur variable is less than (or equal to) the WLim variable. The help provider can be chosen for a particular question if the XCur variable is less than the XLim variable. Additionally, the XMonthCur variable should be less than the XMonthLim variable, and the ZCur variable should be less than the ZLim variable.

In one example, if a help provider sets his/her question limit in a particular manner (e.g., the XLim variable or the XMonthLim variable to 0), the help provider is signaling that he/she does not wish to participate in the question forum. Therefore, this particular user is unavailable and would not be shown in search results as a potential expert. The help provider can increment these limit values at any given time, where the help provider could begin appearing in related searches provided he has granted permission to answer one or more questions.

Consider an example that is illustrative of how these parameters could work. If the help provider sets the XLim variable to 30, and the XMonthLim variable to 20, and if he were asked 10 questions on the first day, he would not be posed with another question until the next day (i.e., assuming the question expiry time=24 hours). If on the next day he is again posed with another set of 10 questions (e.g., XMonthCur and XCur=10+10=20), then on the third day he would not be asked any questions because his monthly quota has been exceeded. In one general sense, the help provider is not penalized for responding quickly in resolving questions and, instead, his future obligations are now restricted. Following along with this particular example, if a month passes, then the help provider's XMonthCur variable is reset to 0. His XCur variable does not decrement; it remains at 20. Thus, although the XMonthCur has room for 20 questions, with the XCur variable at 20, the HP can be asked only the XLim variable minus the XCur variable, which is 10 more questions.

Note that, indirectly, the limits set by a help provider can encourage quality answers because questions would not be closed by the help seeker (who poses the question) unless the help seeker is satisfied with the answers. If questions are not closed by the help seeker, the help provider's XMonthCur variable would not decrement and, further, if the help provider reaches their limits, they will not appear in the search results. This means that the help provider would not have the opportunity to receive new questions. The fewer questions these individuals receive, the lower their chance to gain points/ratings for being helpful. In one particular example, for each request sent to a help provider, he receives a point or an automated score for his helpfulness, which can be a function of his response time, dialogue rate, answering rate, best answer rate, and help seeker feedback rating. Other rating systems can account for different variables, modify these variables, or include lesser variables where appropriate. In addition, the rating systems may be numerically based, scored by a percentage, assigned a letter grade, designated a color code, or using various other methods that would indicate some performance or completeness metric for answering the question.

Note that when an administrator chooses to set the ZLim variable to a low value, that designation can apply pressure on the organization to respond quickly and qualitatively to questions that surface. If these questions are not resolved quickly, the system begins having a pool of open questions, which may lead to a deadlock. If the ZLim value were set to a high value (e.g., 2000), this may lead to a lethargic response from the community (i.e., slacking and not quickly resolving questions). The ZLim variable allows the administrator to control the level of questions being queued at any given time, where incentives can be provided to foster the quality of answers and the responsiveness of the help provider. Along with the ZLim variable, the administrator can also set the WLim variable, which adds an additional control parameter to this system. For example, the administrator can set the ZLim variable to 1000, but the WLim variable to five, which would mean that although the system's open question pool has a limit of 1000, each user is limited to having only five open questions. If there are 50 users in this particular example, and each user utilizes his/her question quota, there can be a maximum of 250 questions open during the non-expiry period (assuming everyone chooses to ask their questions at the same time). This scenario puts pressure on a help provider to effectively answer questions so that the help seeker would systematically close questions.

Another way to view the combination of the ZLim variable and the WLim variable in the architecture is to provide enough room for a help seeker to pose help requests, but concurrently ensure an opportunity to ask questions that are equally divided amongst users in the community. For example, if the ZLim variable and the WLim variable are too close to each other (e.g., ZLim=1000 and =750), a single user could monopolize 750 questions for himself, which would leave the other 49 users with only 250 questions to be shared amongst themselves. However, this constrictive scenario can be countered by configurations of the XLim variable, which can be designated by the help provider. For example, if users set their XLim=2, (e.g., approximately 2×(50−1)), assuming one user is accounted for as the help seeker, there is only the potential to have 98 open questions. Even if the administrator sets the overall limit to 1000 questions and the WLim to 750 questions, the help seeker cannot ask questions that overrule (or otherwise exceed) the help provider's designations. In a general sense, this is illustrative of the way in which variables can interact in order to balance the question inflow and the answer/help outflow.

Figure 3:
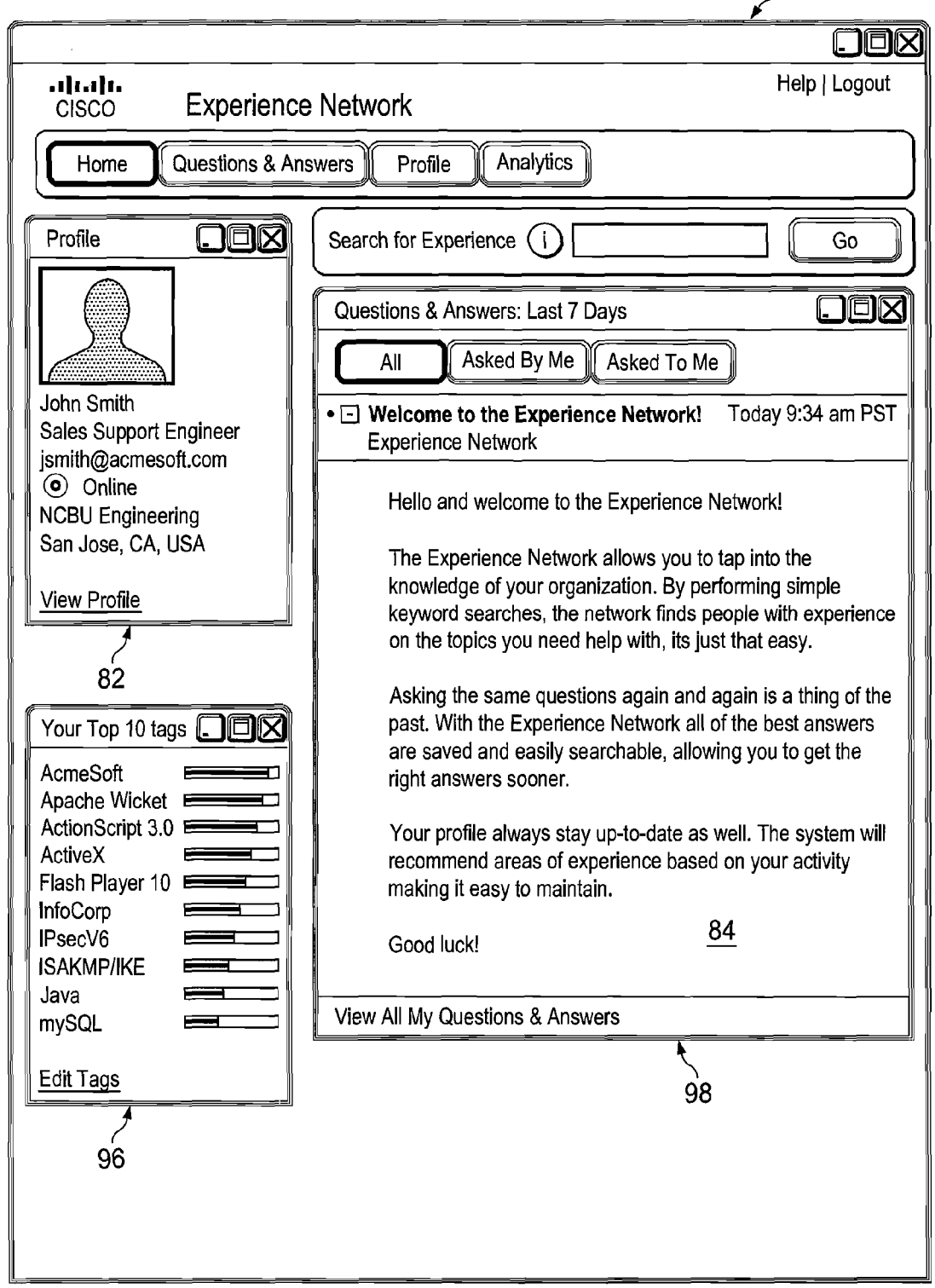
FIG. 3 is a simplified schematic diagram of a webpage associated with the communication system in accordance with one embodiment.

FIG. 3 is a simplified schematic diagram of a webpage 80, which may be used to illustrate one example associated with communication system 10. Webpage 80 may include a profile 82, which in this case includes the user John Smith, who has certain personal information as depicted. Webpage 80 may also include a tag listing 96 that reflects the top subject matter tags associated with this particular end user. On the right-hand side of this illustration, there is a questions/answers element 98. In this particular example, this section only includes those questions and answers posted in the last seven days (and this parameter is easily configured to accommodate other time intervals). Also provided in FIG. 3 is a welcoming prompt 84, which may be used to solicit a query, to offer instructions to new users, to prompt users to perform certain activities, or otherwise assist an end user in performing a search for a particular topic.

Figure 4:
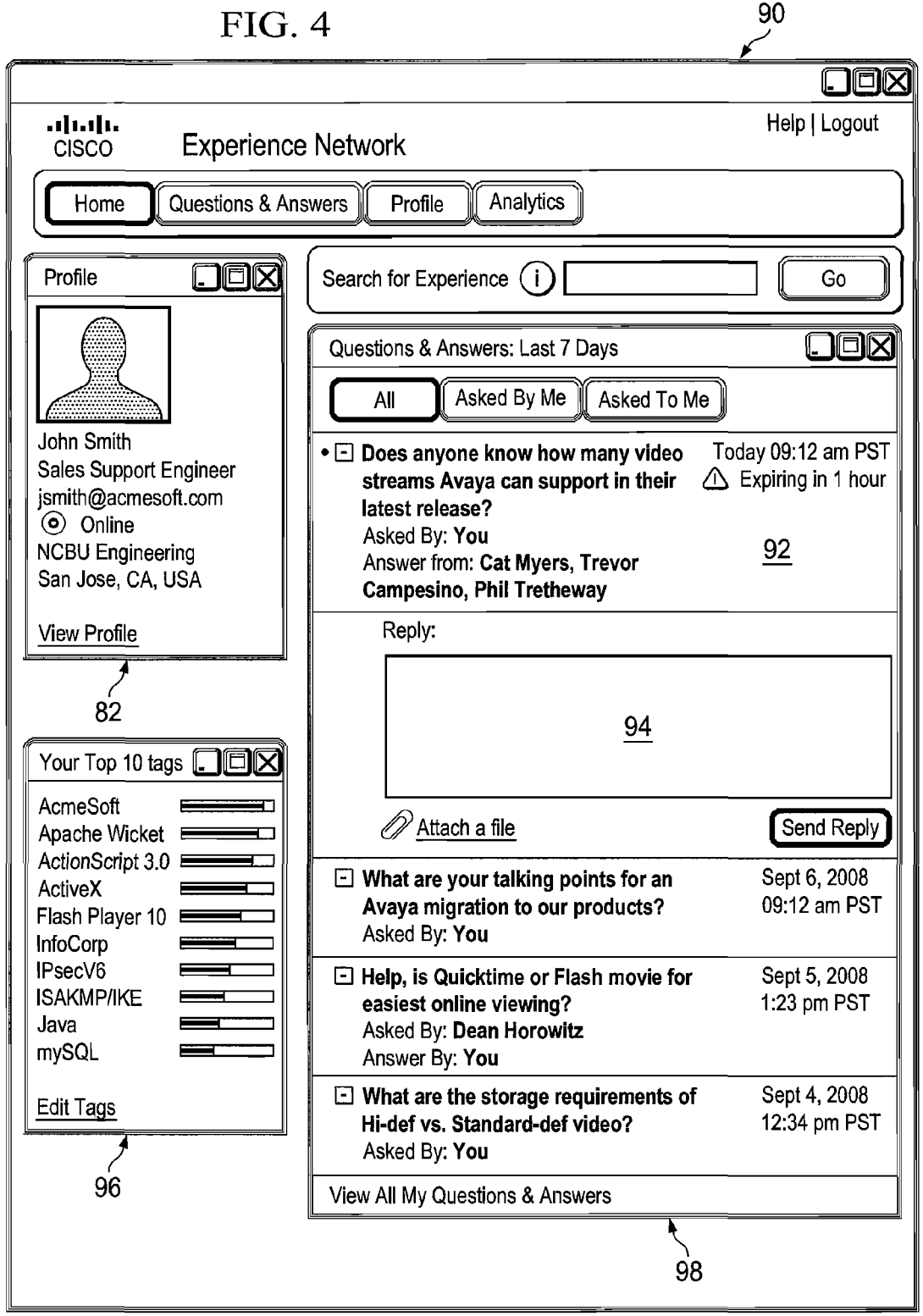
FIG. 4 is a simplified schematic diagram of another webpage associated with the communication system in accordance with one embodiment.

FIG. 4 is a simplified schematic diagram of another example webpage 92, which may include a reply section 94 and a questions section 90. In this particular example, John Smith has asked if any of his colleagues knew the number of video streams a particular technology (e.g., Avaya) could support in their latest release. This question is properly served to the community, where it may be suitably answered by one or more experts associated with this particular technology. Note that the responses from the individuals would be tallied and the responding user would be credited with having answered the particular question. Additionally, a number of checks would be performed to ensure that this responding user has not exceeded his maximum number of questions for a particular time interval. It should also be noted that end users that try to circumvent the question/answer forum would not benefit from any of the incentives put in place by a corporate entity. For example, users that elect not to pose questions through the system would not be able to access the rating and ranking mechanism incorporated into the architecture.

Turning to the underlying data monitoring activities associated with the present disclosure, FIG. 5 is a simplified flowchart illustrating one example operation associated with communication system 10. In this particular flow, at step 110, end user 12 has written an e-mail that includes the content "Optical Switching is a terrific technology." This e-mail message can traverse the network and be received at a router (e.g., a large corporate router, a switch, a switched port analyzer (SPAN) port, or some type of virtual private network (VPN) network appliance). This is reflected by step 120. Network sensor 54 can be provisioned at such a location in order to capture data and/or facilitate the identification of content, as described herein.

In this particular example, FIFO element 56 may receive data in a raw format at step 130. Text extraction module 58 may extract certain fields in order to identify a title, text, authorship, and a uniform resource locator (URL) associated with this particular document at step 140. Note that for this particular instance (where an e-mail is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document (step 150). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by administrator 20 based on particular user needs. The term 'whitelist' as used herein in this Specification is meant to connote any data sought to be targeted for inclusion into the resultant composite of words for administrator 20. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at step 160. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to administrator 20.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by step 170.

Once this document has propagated through noun phrase extractor module 64, the document passes to whitelist 66 at step 180. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field (at step 190), and perform several operations. First, it creates document #2 using the concept field in document #1. Second, it removes the concept field from document #1. Third, it can remove all fields except the concept field from document #2. Fourth, it can send both document #1 and document #2 to clean topics module 70. It should be noted that noun phrase extractor module 64 operates best when considering formal statements (e.g., using proper English). Colloquialisms or folksy speech is difficult to interpret from the perspective of any computer system. More informal documentation (e.g., e-mail) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at step 200. In this particular arrangement, the following stop words can be removed: first name, last name, userid; functional stop word: A, an, the, etc.; e-mail stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering e-mail (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing e-mail stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the central engine side) at step 210. Vocabulary feeder module 44 forwards the document without the concept field and, for the document with the concept field, it sends it to a streams element. In one instance, the streams can be associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of central engine 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 5, vocabulary feeder module 44 can read the concept field (e.g., created by the NLP module) and can feed the noun phrases to the raw vocabulary stream (e.g., "raw_vocab_stream" file) at step 220. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at step 230. This element also suggests the top (e.g., 'n') words to administrator 20 for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to network sensor 54 to copy over to a file (e.g., adminStopWords.txt). This is reflected by step 240. Network collaboration platform 32 can create a file from the table suggested vocabulary terms (e.g., via commands including suggestedby=system, and status=rejected). This file can be a part of the force sync files that can be pushed to the network sensor/central engine (depending on where the stop words mechanism resides). At step 260, emerging vocabulary topics element 46 can look up emerging topics (e.g., within harvested documents) and, systematically, add the emerging and top topics to the architecture for the administrator to consider. Both options can be provided to administrator 20. The emerging topics can be similar to the experience tags such that topics growing in prominence over a given time interval (e.g., a week) can be suggested to administrator 20.

Note that one use of the resulting data is to create a dynamic file for each individual user that is tracked, or otherwise identified through communication system 10. Other applications can involve identifying certain experts in a given area. Other uses could involve building categories or subject matter areas for a given corporate entity, or for individual users. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various media files can be tagged by communication system 10 and associated with particular subject areas, or specific end-user groups. In one instance, both the end user and the video file (or the audio file) can be identified and logically bound together or linked.

Software for providing intelligent vocabulary building and for controlling the exchange of information (e.g., in the form of questions) can be provided at various locations. In one example implementation, this software is resident in a network element, such as network sensor 54, and/or network collaboration platform 32, or in another network element for which this capability is relegated. In other examples, this could involve combining network sensor 54 and/or network collaboration platform 32 with an application server or a gateway, or some proprietary element, which could be provided in (or be proximate to) these identified network elements, or this could be provided in any other device being used in a given network.

In other embodiments, the vocabulary building feature may be provided externally to network sensor 54 and/or network collaboration platform 32, or included in some other network device, or in a computer to achieve these intended functionalities. Along similar lines, network sensor 54 and/or network collaboration platform 32 can include software to achieve the query controlling operations, as outlined herein in this document. In certain example implementations, both the vocabulary building and the query controlling functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. The memory elements and the processors may be deployed individually at network sensor 54, central engine 40, and at network collaboration platform 32, or alternatively these elements may share resources, or have a distributed system in which a single processor and a single memory element can be accessed. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building and the query controlling operations as outlined herein. Additionally, each of these devices may include a processor that can execute software or an algorithm to perform the vocabulary building and the query controlling activities discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
   receiving data propagating in a network environment;
   organizing the data into one or more subjects;
   receiving a request for information from a first Questioner associated with a particular subject, wherein the first questioner is restricted in his Questioning by an information limit;
   identifying, using a processor, an individual associated with the particular subject; and
   communicating the request to the individual if an open questions limit has not been exceeded for the individual.

2. The method of claim 1, further comprising:
   maintaining a profile associated with each of a plurality of users in the network environment, wherein the profile includes a number of questions presented to each user, a number of questions answered by each user, and a configured limit on how many questions each user is permitted to receive.

3. The method of claim 1, further comprising:
   receiving a communication from an individual associated with the request; and
   marking the request as being resolved as a result of the communication.

4. The method of claim 1, further comprising:
   designating a total number of requests that can be communicated to the individual during a given time interval.

5. The method of claim 1, further comprising:
   rating a response to the request from the individual; and
   crediting the individual with a point based on the response.

6. The method of claim 1, further comprising:
   evaluating one or more limits associated with a plurality of users in response to receiving the request; and
   returning an identifier for at least one of the users based on one or more of the limits having not been exceeded, wherein at least one of the limits reflects an election from the users for accepting new requests over a designated time interval.

7. The method of claim 1, further comprising:
   receiving a response for the request from the individual, wherein an award is allocated to the individual based on the response.

8. Logic encoded in one or more non-transitory media that includes code for execution and when executed by a processor is operable to perform operations comprising:
   receiving data propagating in a network environment;
   organizing the data into one or more subjects;
   receiving a request for information from a first questioner associated with a particular subject, wherein the first questioner is restricted in his questioning by an information limit;
   identifying an individual associated with the particular subject; and
   communicating the request to the individual if an open questions limit has not been exceeded for the individual.

9. The logic of claim 8, the processor being further operable to perform operations comprising:
   maintaining a profile associated with each of a plurality of users in the network environment, wherein the profile includes a number of questions presented to each user, a number of questions answered by each user, and a configured limit on how many questions each user is permitted to receive.

10. The logic of claim 8, the processor being further operable to perform operations comprising:
    receiving a communication from an individual associated with the request; and
    marking the request as being resolved as a result of the communication.

11. The logic of claim 8, the processor being further operable to perform operations comprising:
    designating a total number of requests that can be open between a plurality of users during a given time interval.

12. The logic of claim 8, the processor being further operable to perform operations comprising:
    rating a response to the request from the individual; and
    crediting the individual with a point based on the response.

13. The logic of claim 8, the processor being further operable to perform operations comprising:
    evaluating one or more limits associated with a plurality of users in response to receiving the request; and
    returning an identifier for at least one of the users based on one or more of the limits having not been exceeded, wherein at least one of the limits reflects an election from the users for accepting new requests over a designated time interval.

14. The logic of claim 8, the processor being further operable to perform operations comprising:

receiving a response for the request from the individual, wherein an award is allocated to the individual based on the response.

15. An apparatus, comprising:
a memory element configured to store data;
a processor operable to execute instructions associated with the data; and
a request control module configured to interface with the memory element and the processor, the request control module being configured to:
receive data propagating in a network environment;
organize the data into one or more subjects;
receiving a request for information from a first questioner associated with a particular subject, wherein the first questioner is restricted in his questioning by an information limit;
identify an individual associated with the particular subject; and
communicate the request to the individual if an open questions limit has not been exceeded for the individual.

16. The apparatus of claim 15, wherein the memory element includes a database configured to maintain a profile associated with each of a plurality of users in the network environment, wherein the profile includes a number of questions presented to each user, a number of questions answered by each user, and a configured limit on how many questions each user is permitted to receive.

17. The apparatus of claim 15, wherein the request control module is further configured to:
designate a total number of requests that can be open between a plurality of users during a given time interval.

18. The apparatus of claim 15, wherein the request control module is further configured to:
evaluate one or more limits associated with a plurality of users in response to receiving the request; and
return an identifier for at least one of the users based on one or more of the limits having not been exceeded, wherein at least one of the limits reflects an election from the users for accepting new requests over a designated time interval.

19. The apparatus of claim 15, further comprising:
a user interface configured to present a response to the request from the individual associated with the particular subject.

20. The apparatus of claim 19, further comprising:
a search module configured to evaluate the request for the particular subject and to coordinate a response to the request.

* * * * *